United States Patent
Moon et al.

(10) Patent No.: US 9,196,886 B2
(45) Date of Patent: Nov. 24, 2015

(54) SECONDARY BATTERY HAVING INSULATION BAG

(75) Inventors: Jongseok Moon, Yongin-si (KR); Byungkyu Ahn, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 965 days.

(21) Appl. No.: 12/871,607

(22) Filed: Aug. 30, 2010

(65) Prior Publication Data
US 2011/0183181 A1 Jul. 28, 2011

(30) Foreign Application Priority Data
Jan. 27, 2010 (KR) .................. 10-2010-0007465

(51) Int. Cl.
*H01M 2/18* (2006.01)
*H01M 2/02* (2006.01)
*H01M 10/02* (2006.01)

(52) U.S. Cl.
CPC .............. *H01M 2/18* (2013.01); *H01M 2/028* (2013.01); *H01M 2/029* (2013.01); *H01M 2/0237* (2013.01); *H01M 2/0262* (2013.01); *H01M 2/0275* (2013.01); *H01M 2/0277* (2013.01); *H01M 10/02* (2013.01); *Y02E 60/122* (2013.01)

(58) Field of Classification Search
CPC . H01M 2/0275; H01M 2/0277; H01M 2/028; H01M 2/029
USPC ............................. 429/94, 162, 163, 179, 136
See application file for complete search history.

(56) References Cited

U.S. PATENT DOCUMENTS

| 6,040,082 | A | 3/2000 | Haas et al. | |
|---|---|---|---|---|
| 8,518,571 | B2* | 8/2013 | Kawase et al. | 429/94 |
| 2004/0096732 | A1* | 5/2004 | Shin et al. | 429/61 |
| 2005/0277017 | A1 | 12/2005 | Cho | |
| 2005/0277018 | A1* | 12/2005 | Kim | 429/120 |

(Continued)

FOREIGN PATENT DOCUMENTS

| CN | 1501525 A | 6/2004 |
|---|---|---|
| CN | 1702886 A | 11/2005 |

(Continued)

OTHER PUBLICATIONS

Korean Notice of Allowance dated Apr. 29, 2011 issued to Korean Priority Application No. 10-2010-0007465.

(Continued)

*Primary Examiner* — Carlos Barcena
(74) *Attorney, Agent, or Firm* — Christie, Parker & Hale, LLP

(57) ABSTRACT

A secondary battery includes an electrode assembly, an insulation bag, a case, and a cap plate. The electrode assembly includes first and second electrodes, and a separator between the electrodes. The insulation bag has an open top and houses the electrode assembly. The case houses the electrode assembly and the insulation bag. The cap plate seals the case. The insulation bag includes first and second side surface portions, and first and second extending portions. The first and second side surface portions face one another and extend from one side to an opposite side. The first extending portion extends from an upper end of the first side surface portion at the one side. The second extending portion extends from an upper end of the second side surface portion at the opposite side.

18 Claims, 22 Drawing Sheets

(56) References Cited

U.S. PATENT DOCUMENTS

| | | |
|---|---|---|
| 2006/0093898 A1* | 5/2006 | Kwak et al. ............... 429/94 |
| 2006/0099503 A1* | 5/2006 | Lee ............... 429/176 |
| 2009/0186269 A1 | 7/2009 | Kim et al. |
| 2009/0246639 A1 | 10/2009 | Kim |
| 2010/0203373 A1 | 8/2010 | Kawase et al. |
| 2010/0209750 A1 | 8/2010 | Nagamatsu et al. |
| 2011/0059344 A1 | 3/2011 | Kawase et al. |
| 2011/0086265 A1 | 4/2011 | Suzuki |

FOREIGN PATENT DOCUMENTS

| | | |
|---|---|---|
| CN | 2754223 A | 1/2006 |
| JP | 62-118693 | 7/1987 |
| JP | 64-23875 U | 2/1989 |
| JP | 06-096793 | 4/1994 |
| JP | 08-287944 | 11/1996 |
| JP | 11-204115 | 7/1999 |
| JP | 2005-332824 | 12/2005 |
| JP | 2006-278245 | 10/2006 |
| JP | 2009-026704 A | 2/2009 |
| JP | 2009-048966 A | 3/2009 |
| JP | 2009-277443 | 11/2009 |
| JP | 2009-301892 A | 12/2009 |
| KR | 10-2007-0014656 | 2/2007 |
| KR | 10-2009-0081197 | 7/2009 |
| WO | WO 2009014121 A1 * | 1/2009 |

OTHER PUBLICATIONS

Extended European Search Report dated Mar. 18, 2011 issued by the European Patent Office to corresponding European Patent Application No. 11150049.2-1227.
Machine translation of JP 2006-278245, 18 pages.
Japanese Office action dated Aug. 14, 2012 issued to corresponding Japanese Application No. 2010-269565, 3 pages.
SIPO Office action dated May 15, 2013, for corresponding Chinese Patent application 201010585688.6, (7 pages).
English machine translation of Claim 1 only, for Japanese Utility Model Patent publication 64-23875, (1 page).

* cited by examiner

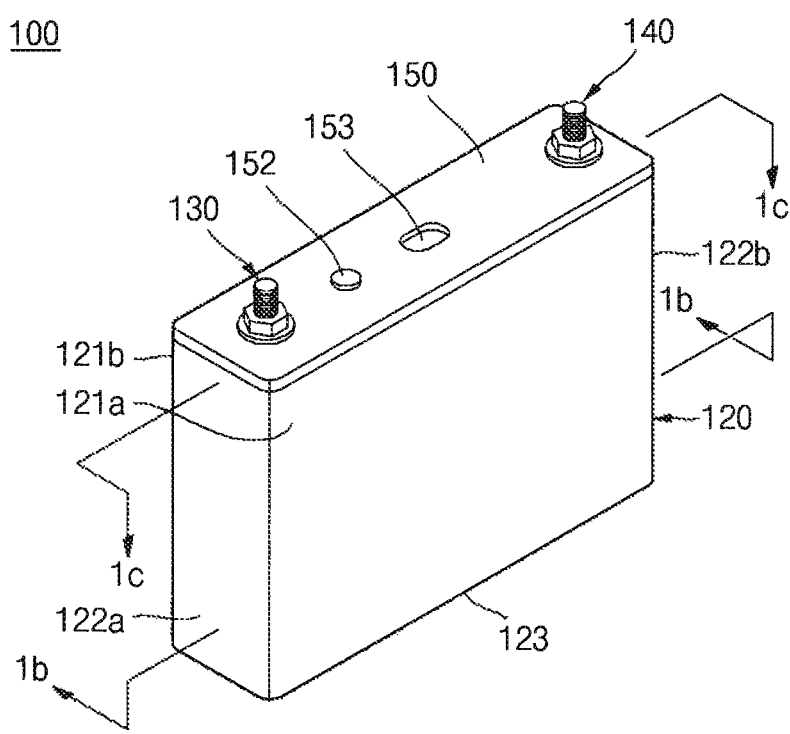

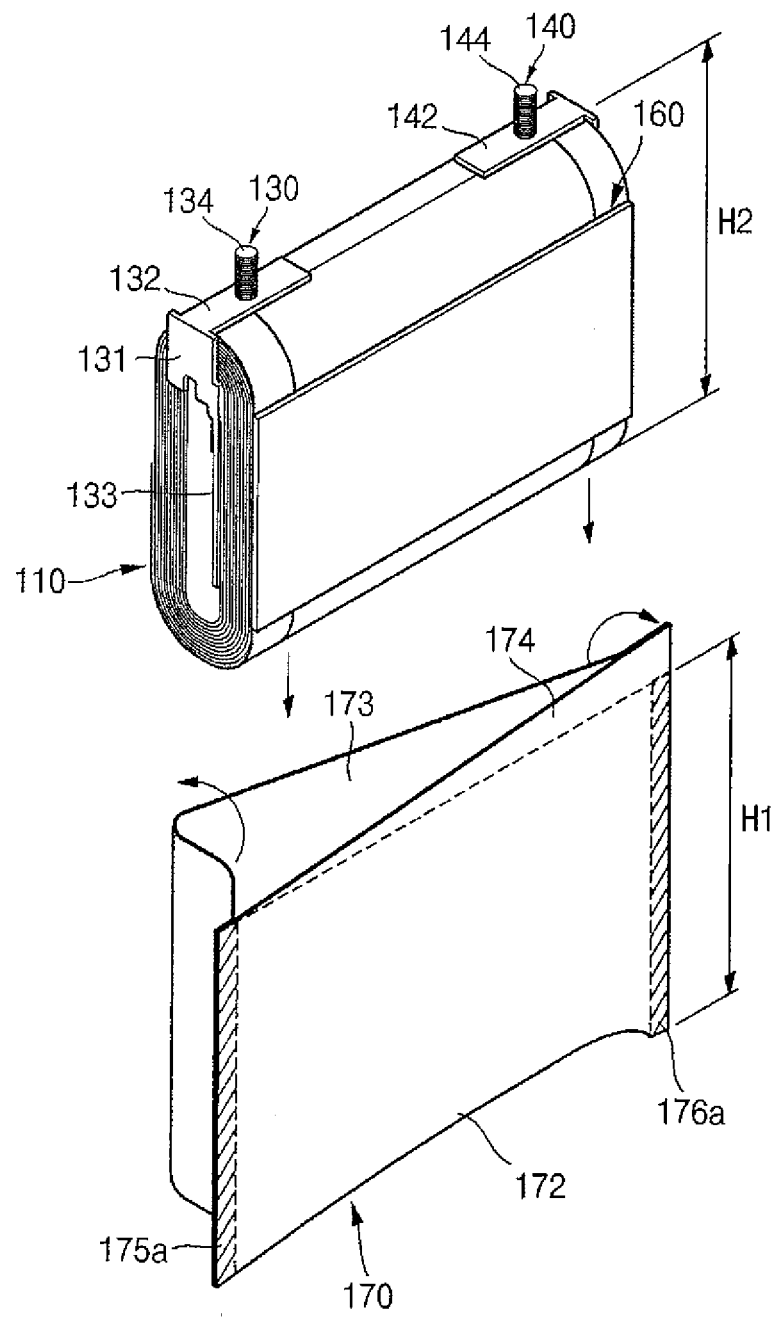

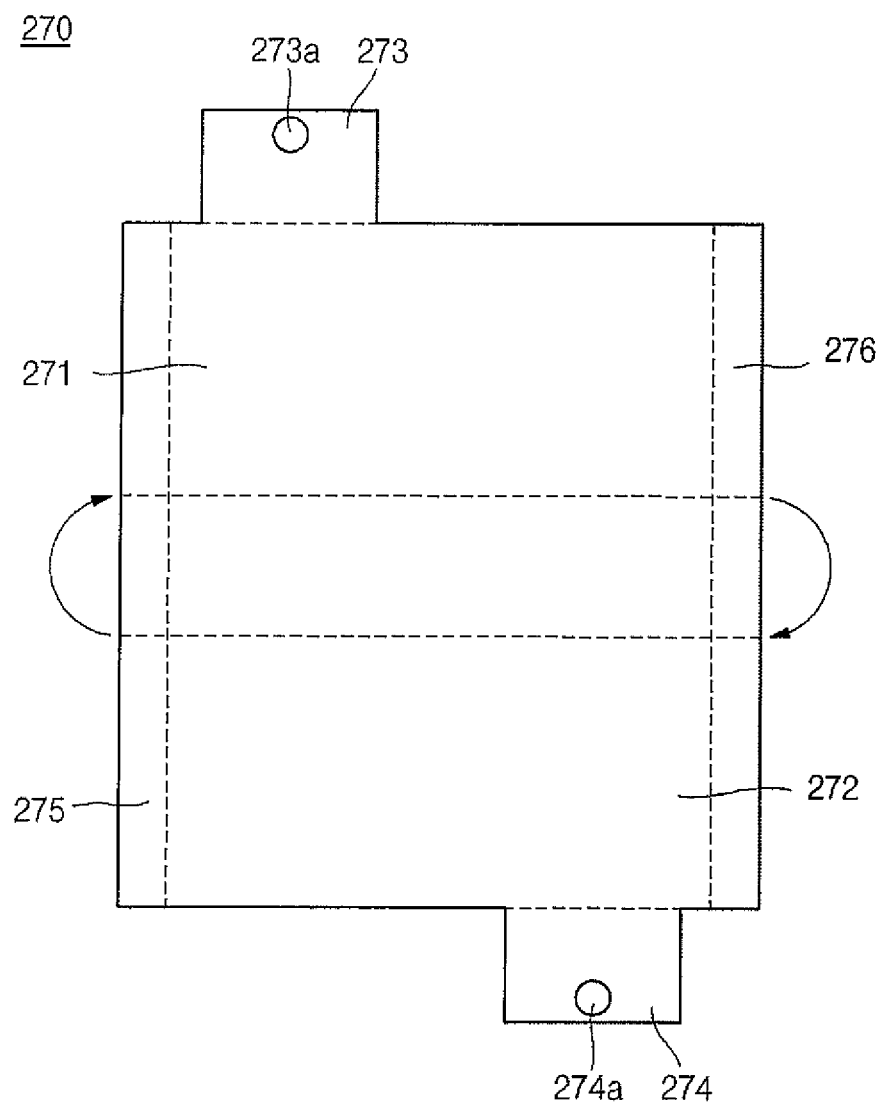

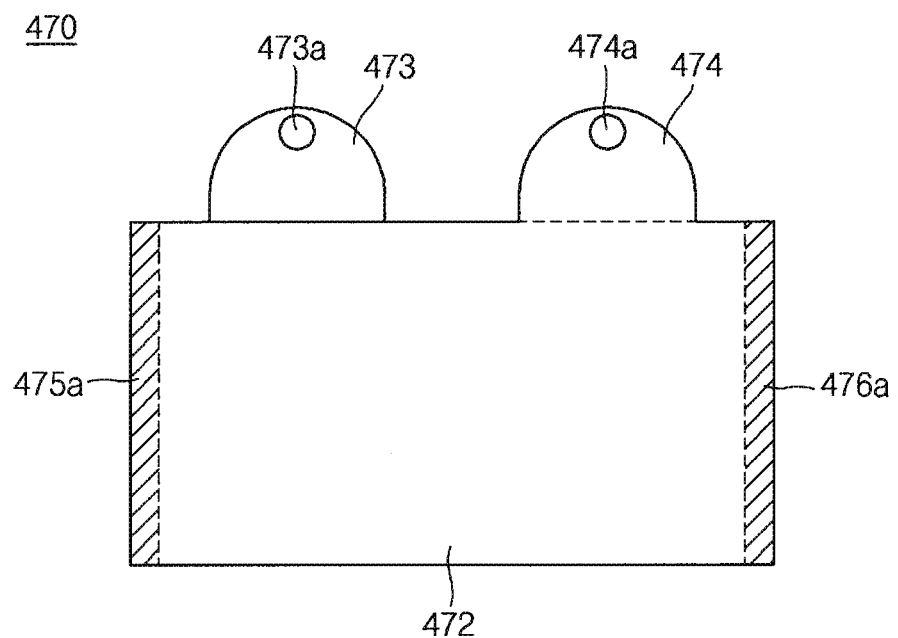

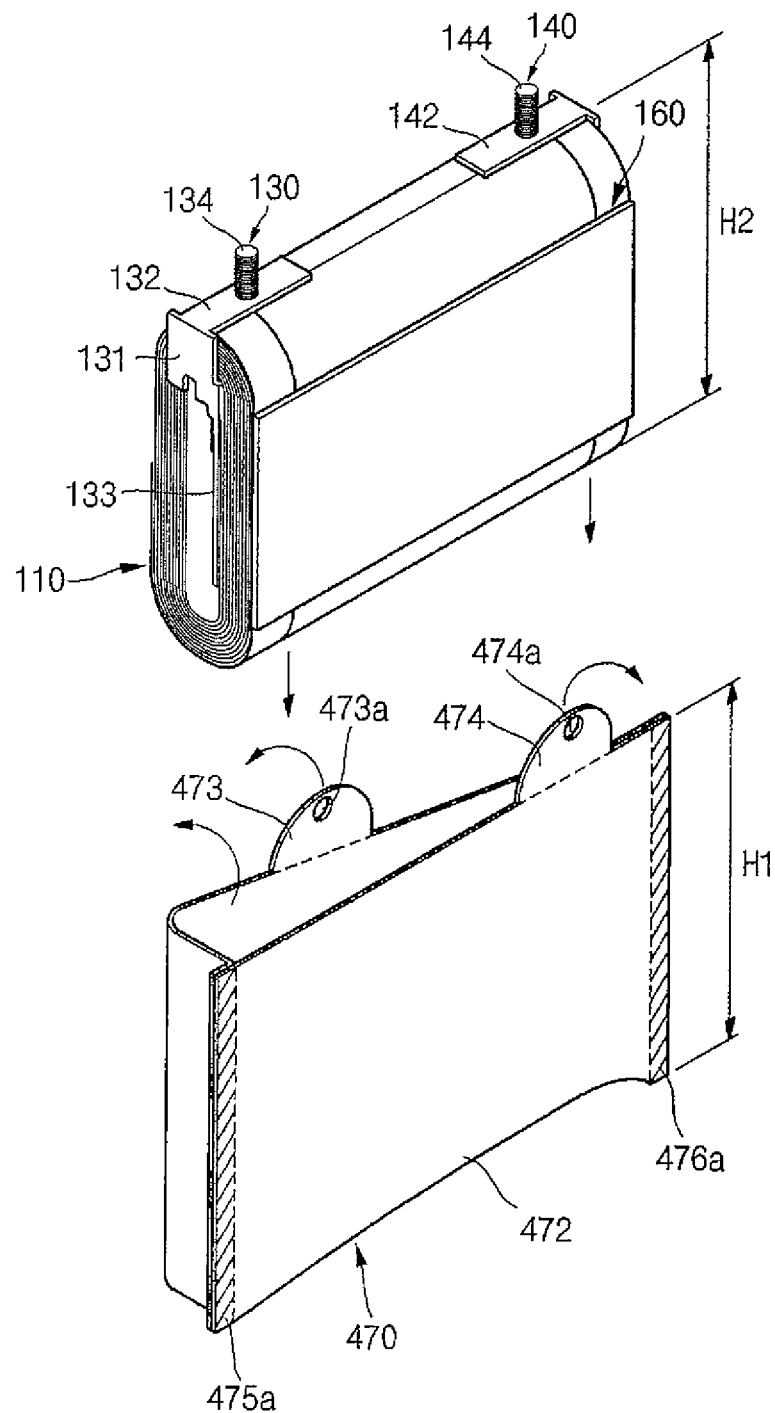

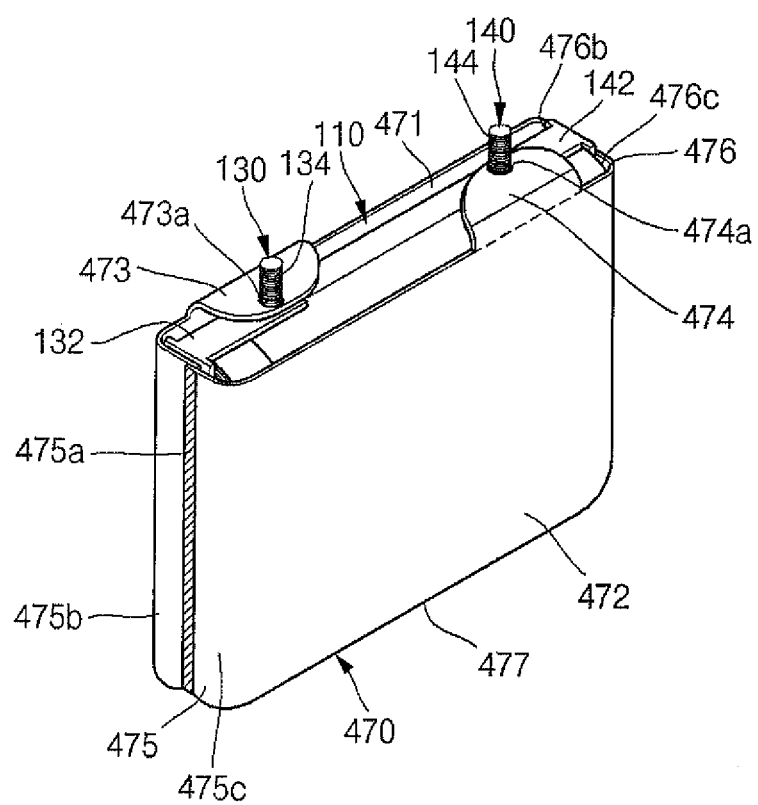

SECONDARY BATTERY HAVING INSULATION BAG

CROSS-REFERENCE TO RELATED APPLICATION

This application claims priority to and the benefit of Korean Patent Application No. 10-2010-0007465, filed on Jan. 27, 2010, the entire content of which is incorporated herein by reference.

BACKGROUND

1. Field

Example embodiments of the present invention relate to secondary batteries.

2. Description of the Related Art

In general, unlike a non-rechargeable primary battery, a secondary battery is one that is capable of being charged and discharged repeatedly.

From among secondary batteries, lithium ion secondary batteries in particular have typically been used in small electronic devices such as laptop computers and cellular phones. Additionally, because lithium ion secondary batteries have the characteristics of high power output, high capacity, and light weight in comparison to other types of secondary batteries, they have begun to be used in hybrid vehicles and electric vehicles.

SUMMARY

An aspect of the exemplary embodiments according to the present invention provides a secondary battery that improves work efficiency in housing an electrode assembly in an insulation bag.

According to at least one exemplary embodiment, a secondary battery includes: an electrode assembly including a first electrode, a second electrode, and a separator between the first electrode and the second electrode; an insulation bag having an open top and housing the electrode assembly therein; a case housing the electrode assembly and the insulation bag therein; and a cap plate sealing the case, wherein the insulation bag includes: a first side surface portion extending from one side to an opposite side; a second side surface portion extending from the one side to the opposite side and facing the first side surface portion; a first extending portion extending from an upper end of the first side surface portion at the one side; and a second extending portion extending from an upper end of the second side surface portion at the opposite side.

The upper end of the first side surface portion may be lower than an upper end of the second extending portion.

The upper end of the second side surface portion may be lower than an upper end of the first extending portion.

The insulation bag may further include: a third side surface portion connecting an end of the first side surface portion at the one side to an end of the second side surface portion at the one side; and a fourth side surface portion connecting an end of the first side surface portion at the opposite side to an end of the second side surface portion at the opposite side.

The third side surface portion and the fourth side surface portion may respectively include: a sealing portion at a center thereof; a first sub-side surface portion extending from the sealing portion to the first side surface portion; and a second sub-side surface portion extending from the sealing portion to the second side surface portion.

The sealing portion may be formed by thermal bonding.

The insulation bag may further include: a third extending portion extending upward from an upper end of the third side surface portion; and a fourth extending portion extending upward from an upper end of the fourth side surface portion.

The third extending portion may extend upward from upper ends of the sealing portion and the first sub-side surface portion of the third side surface portion, and the fourth extending portion may extend upward from upper ends of the sealing portion and the second sub-side surface portion of the fourth side surface portion.

The first extending portion and the third extending portion may extend together.

The second extending portion and the fourth extending portion may extend together.

The insulation bag may further include a bottom surface portion extending from a bottom end of the first side surface portion, a bottom end of the second side surface portion, a bottom end of the third side surface portion, and a bottom end of the fourth side surface portion.

The secondary battery may further include: a first electrode terminal electrically connected to the first electrode, and extending outward through the cap plate; and a second electrode terminal electrically connected to the second electrode, and extending outward through the cap plate.

The first electrode may include a first non-coating portion not coated with a first active material and extending toward the one side, the second electrode may include a second non-coating portion not coated with a second active material and extending toward the opposite side, and the first electrode terminal may be welded to the first non-coating portion, and the second electrode terminal may be welded to the second non-coating portion.

The first electrode terminal may pass through a first coupling through-hole defined in the first extending portion, and the second electrode terminal may pass through a second coupling through-hole defined in the second extending portion.

The first extending portion and the second extending portion may have a triangular shape, a quadrangular shape, or a semicircular shape.

The first side surface portion and the second side surface portion may have a greater height than the electrode assembly.

The secondary battery may further include a nail safety device interposed between the electrode assembly and the insulation bag, and electrically connected to the first electrode or the second electrode of the electrode assembly.

The insulation bag may include PP (polypropylene) material.

BRIEF DESCRIPTION OF THE DRAWINGS

The accompanying drawings illustrate exemplary embodiments of the present invention and, together with the description, serve to explain principles of the present invention. In the drawings:

FIG. 1A illustrates a perspective view of a secondary battery according to an exemplary embodiment;

FIGS. 2A to 2D are diagrams illustrating a process of housing an electrode assembly in an insulation bag of a secondary battery according to an exemplary embodiment;

FIGS. 3A to 3E are diagrams illustrating a process of housing an electrode assembly in an insulation bag of a secondary battery according to another exemplary embodiment;

FIGS. 5A to 5E are diagrams illustrating a process of housing an electrode assembly in an insulation bag of a secondary battery according to another exemplary embodiment.

DETAILED DESCRIPTION

Examplary embodiments will now be described in more detail hereinafter with reference to the accompanying drawings.

The configuration of a secondary battery according to an exemplary embodiment will be described below.

Figure 1B:
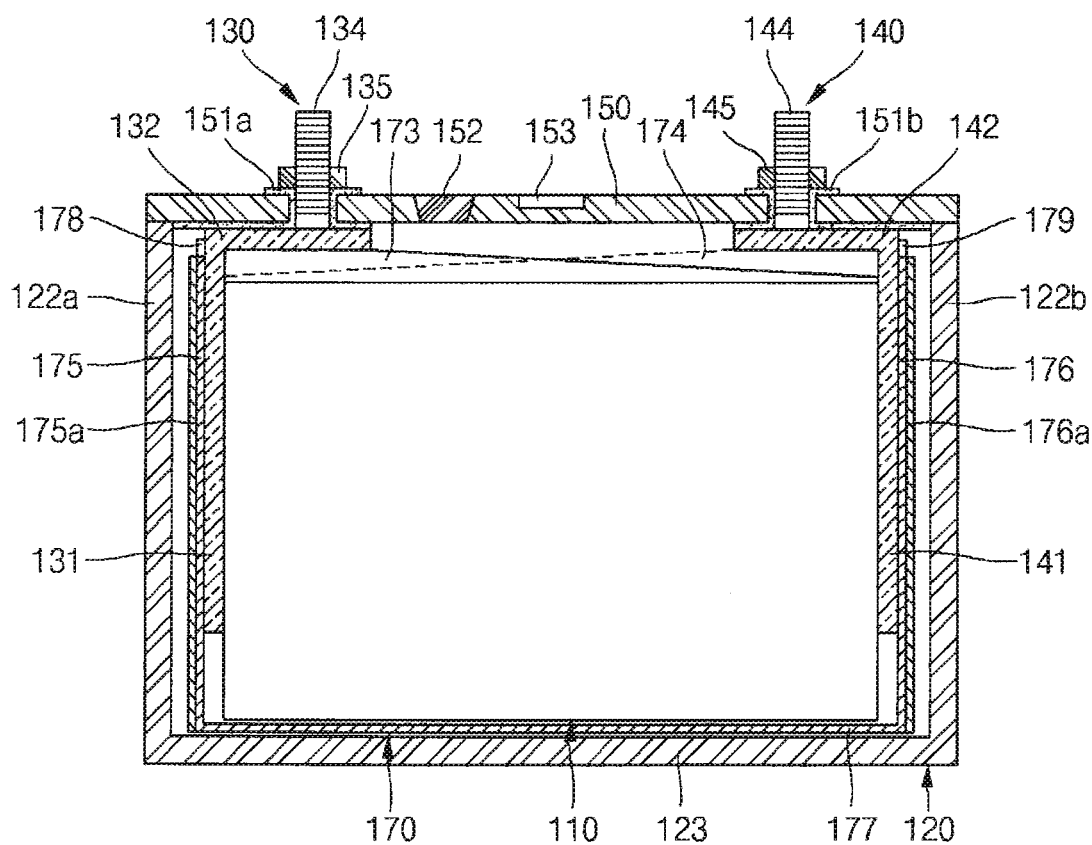
FIG. 1B illustrates a sectional view taken along line 1b-1b in FIG. 1A.
Figure 1C:
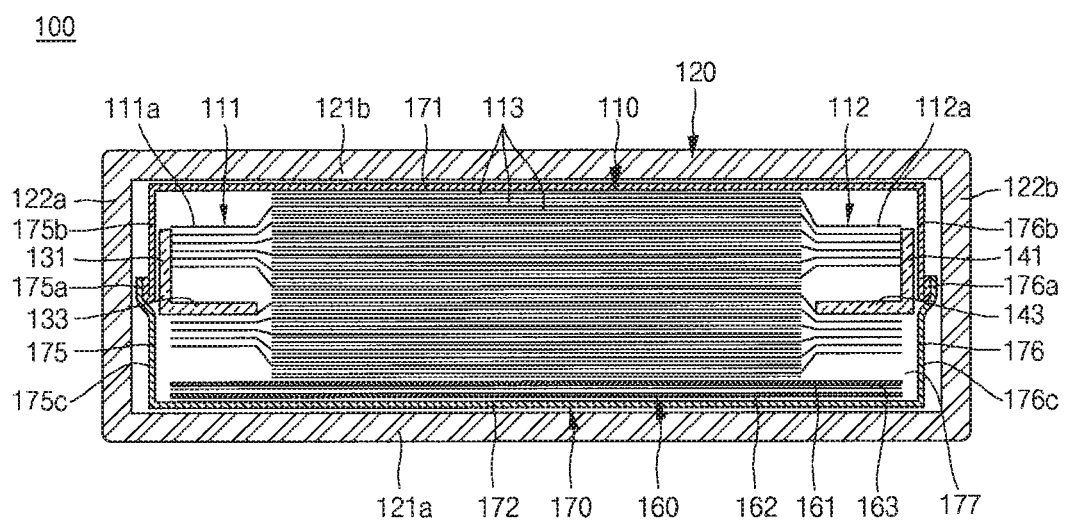
FIG. 1C illustrates a sectional view taken along line 1c-1c in FIG. 1A.

FIG. 1A illustrates a perspective diagram of a secondary battery according to an exemplary embodiment, FIG. 1B illustrates a sectional diagram taken along the line 1b-1b in FIG. 1A, and FIG. 1C illustrates a sectional diagram taken along the line 1c-1c in FIG. 1A.

Referring to FIGS. 1A to 1C, a secondary battery 100 according to an exemplary embodiment includes an electrode assembly 110, a case 120, a first electrode terminal 130, a second electrode terminal 140, a cap plate 150, a nail safety device 160, and an insulation bag 170. The case 120 includes two wide side surfaces 121a and 121b, two narrow side surfaces 122a and 122b, and one floor surface 123. The case 120 is open at the top. The electrode assembly 110 is housed together with electrolyte in the case 120. In the description below, the narrow side surface 122a of the case 120 may also be referred to as one side, and another narrow side surface 122b of the case 120 may also be referred to as the other side.

The electrode assembly 110 includes a first electrode 111, a second electrode 112, and a separator 113. The electrode assembly 110 may be formed in the approximate shape of a jelly roll, or may be configured in a stack. The first electrode 111 may be a positive electrode plate, and the second electrode 112 may be a negative electrode plate. In other embodiments, the first electrode 111 may be a negative electrode plate, and the second electrode 112 may be a positive electrode plate. The first electrode 111 may include a first metal foil and a first electrode active material. The first electrode 111 may include a first non-coating portion 111a that is not coated with a first electrode active material, and the first non-coating portion 111a may project through one side of the separator 113 to the outside. In the case where the first electrode 111 is a positive electrode plate, the first metal foil may be aluminum, and the first active material may be a lithium-based oxide. The second electrode 112 may also include a second metal foil and a second active material. The second electrode 112 also includes a second non-coating portion 112a that is not coated with a second electrode active material, and the second non-coating portion 112a may project through the other side of the separator 113 to the outside. Accordingly, the first non-coating portion 111a and the second non-coating portion 112a may project in opposite directions with respect to the separator 113 at the center. In the case where the second electrode 112 is a negative electrode plate, the second metal foil may be copper, and the second active material may be graphite. Of course, the materials that may be used in the exemplary embodiments are not limited to the materials described herein. The separator 113 is located between the first electrode 111 and the second electrode 112.

The separator 113 may actually be located on either side surface of the first electrode 111 or on either side surface of the second electrode 112. Further, the separator 113 is located at the outermost edge of the electrode assembly 110 for preventing shorting between certain regions of the electrode assembly 110 with the case 120, cap plate 150, and nail safety device 160. The separator 113 may be formed from a material selected from any one of PE (polyethylene), PP (polypropylene), and equivalents thereof, but is not limited thereto.

The first non-coating portion 111a and the second non-coating portion 112a of the electrode assembly 110 respectively form the narrow side surfaces 122a and 122b. Also, the case 120 may be formed from a material selected from one of aluminum, copper, iron, SUS (steel use stainless), ceramic, polymer, and equivalents thereof, but is not limited thereto.

The first electrode terminal 130 is formed including a first extending portion 131, a second extending portion 132, a welded portion 133, a bolt extending portion 134, and a nut 135. The first extending portion 131 is formed at one end of the electrode assembly 110. Also, the second extending portion 132 extends at the upper portion of the first extending portion 131. The welded portion 133 extends from a portion of the first extending portion 131 and inserts a certain depth into the first electrode 111 of the electrode assembly 110, or the first non-coating portion 111a. The welded portion 133 is welded to the first non-coating portion 111a. The bolt extending portion 134 extends from the second extending portion 132 and projects through the cap plate 150 to the outside. The nut 135 is coupled to the bolt extending portion 134, and firmly fixes the first electrode terminal 130 to the cap plate 150.

The second electrode terminal 140 includes a first extending portion 141, a second extending portion 142, a welded portion 143, a bolt extending portion 144, and a nut 145. The first extending portion 141 is formed on the other end of the electrode assembly 110. Also, the second extending portion 142 extends from the upper portion of the first extending portion 141. The welded portion 143 extends from a portion of the first extending portion 141, and is inserted a certain depth into the second electrode 112 of the electrode assembly 110, or the second non-coating portion 112a. The welded portion is welded to the second non-coating portion 112a. The bolt extending portion 144 extends from the second extending portion 142, and passes through the cap plate 150 to the outside. The nut 145 is coupled to the bolt extending portion 144, for firmly fixing the second electrode terminal 140 to the cap plate 150.

The cap plate 150 is formed including insulators 151a and 151b, an electrolyte plug 152, and a safety vent 153. The cap plate 150 allows the first electrode terminal 130 and second electrode terminal 140 to project outward, while covering the case 120. The boundary between the cap plate 150 and the case 120 may be welded with a laser. The insulators 151a and 151b may be formed on the outer peripheries of the bolt extending portions 134 and 144, respectively, of the first electrode terminal 130 and the second electrode terminal 140. The electrolyte plug 152 may cover an electrolyte injection hole. The safety vent 153 may be formed of a comparatively slight thickness in the cap plate 150. The cap plate 150 may be formed of the same material as the case 120. The first electrode terminal 130 and the second electrode terminal 140 are electrically insulated from the cap plate 150 by the insulators 151a and 151b. Through this configuration, the case 120 and the cap plate 150 may be made electrically neutral. That is, the case 120 and cap plate 150 do not have polarities (a positive polarity or a negative polarity). However, the case 120 and cap plate 150 may be given polarities according to circumstances.

The nail safety device 160 may include a first conductive plate 161, a second conductive plate 162, and an insulation film 163 located between the first conductive plate 161 and the second conductive plate 162. The nail safety device 160 is located between the electrode assembly 110 and the case 120. The nail safety device 160 may be located between the electrode assembly 110 and at least one of the wide side surfaces 121a and 121b of the case 120. The first conductive plate 161 is electrically connected to the first electrode 111. Specifically, the first conductive plate 161 is welded to the first electrode 111. The second conductive plate 162 is electrically connected to the second electrode 112. Specifically, the second conductive plate 162 is welded to the second electrode 112. The insulation film 163 prevents electrical short circuiting between the first conductive plate 161 and the second conductive plate 162 prior to the operation of the nail safety device 160. Thus, if the insulation film 163 is torn or damaged from puncturing or compression, the first conductive plate 161 and the second conductive plate 162 of the nail safety device 160 are directly electrically short-circuited. Because the first conductive plate 161 and the second conductive plate 162 of the nail safety device 160 have low electrical resistance, not much heat is generated from a short circuit, while a large current is quickly consumed. Accordingly, there is little heat generated from puncturing or compression of the secondary battery 100, thereby improving safety and reliability of the secondary battery.

The insulation bag 170 may be in the shape of a pocket open at the top. The insulation bag 170 is located between the electrode assembly 110 and the case 120. The insulation bag 170 may be formed of the insulation material PP (polypropylene) in one embodiment but is not limited thereto.

In further detail, the insulation bag 170 includes a first side surface portion 171, a second side surface portion 172, a first extending portion 173, a second extending portion 174, a third side surface portion 175, a fourth side surface portion 176, and a bottom surface portion 177. Also, the insulation bag 170 may further include a third extending portion 178 and a fourth extending portion 179.

The first side surface portion 171 may be plate-shaped and formed between the electrode assembly 110 and the wide side surface 121a of the case 120, extending from one edge to the other edge.

The second side surface portion 172 may be plate-shaped and formed opposite the first side surface portion 171, between the electrode assembly 110 and the other wide side surface 121b of the case, extending from one edge to the other edge.

The first extending portion 173 extends upward from one edge at the top of the first side surface portion 171.

The second extending portion 174 extends upward from the other edge at the top of the second side surface portion 172.

The third side surface portion 175 connects one edge of the first side surface portion 171 with one edge of the second side surface portion 172. Specifically, the third side surface portion 175 may include a sealing portion 175a, a first sub-side surface portion 175b extending from the sealing portion 175a to the first side surface portion 171, and a second sub-side surface portion 175c extending from the sealing portion 175a to the second side surface portion 172.

The fourth side surface portion 176 connects the other edge of the first side surface portion 171 with the other edge of the second side surface portion 172. Specifically, the fourth side surface portion 176 may include a sealing portion 176a, a first sub-side surface portion 176b extending from the sealing portion 176a to the first side surface portion 171, and a second sub-side surface portion 176c extending from the sealing portion 176a to the second side surface portion 172.

The bottom surface portion 177 extends from the bottom of the first side surface portion 171, the bottom of the second side surface portion 172, the bottom of the third side surface portion 175, and the bottom of the fourth side surface portion 176.

The third extending portion 178 extends upward from the top of the sealing portion 175a of the third side surface portion 175 and the first sub-side surface portion 175b. Also, the third extending portion 178 may extend from the first extending portion 173.

The fourth extending portion 179 extends upward from the top of the sealing portion 176a of the fourth side surface portion 176 and the second sub-side surface portion 175c. Also, the fourth extending portion 179 may extend from the second extending portion 174.

A more detailed description of the structure and manufacturing process of the insulation bag 170 will be provided below.

In the description below, the configuration of an insulation bag in a secondary battery according to exemplary embodiments, and the process of housing an electrode assembly inside the insulation bag will be described in detail.

FIGS. 2A to 2D are diagrams illustrating a process of housing an electrode assembly in an insulation bag of a secondary battery according to an exemplary embodiment.

Figure 2A:
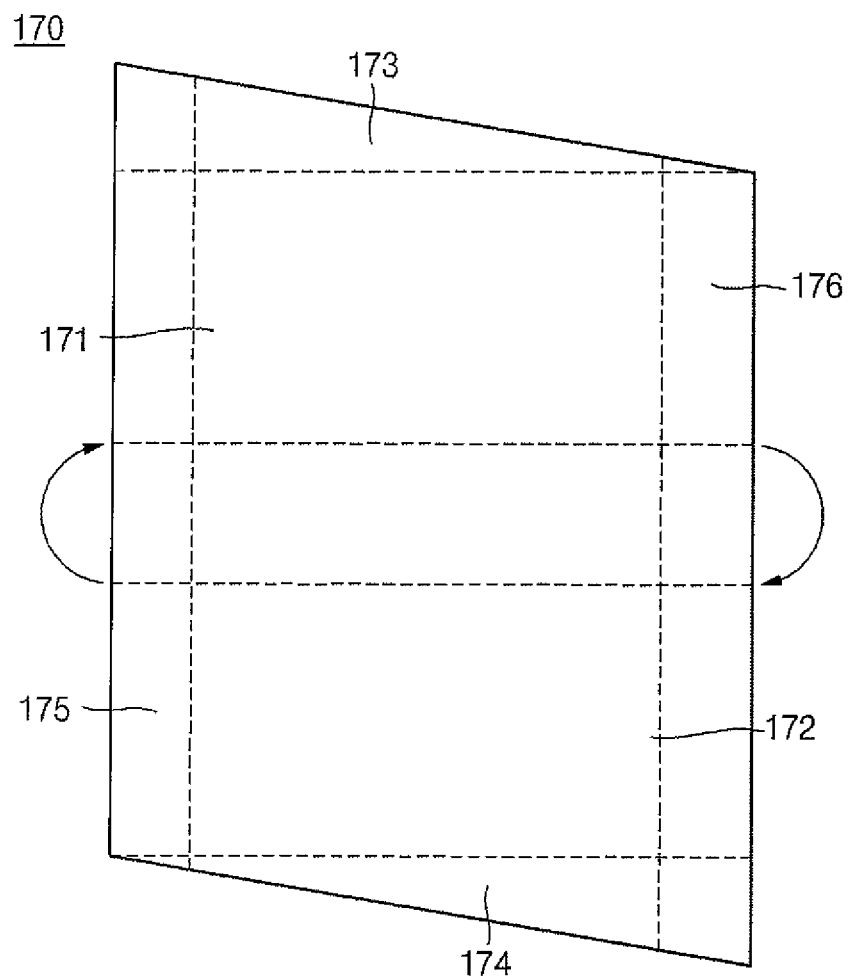
Figure 2B:
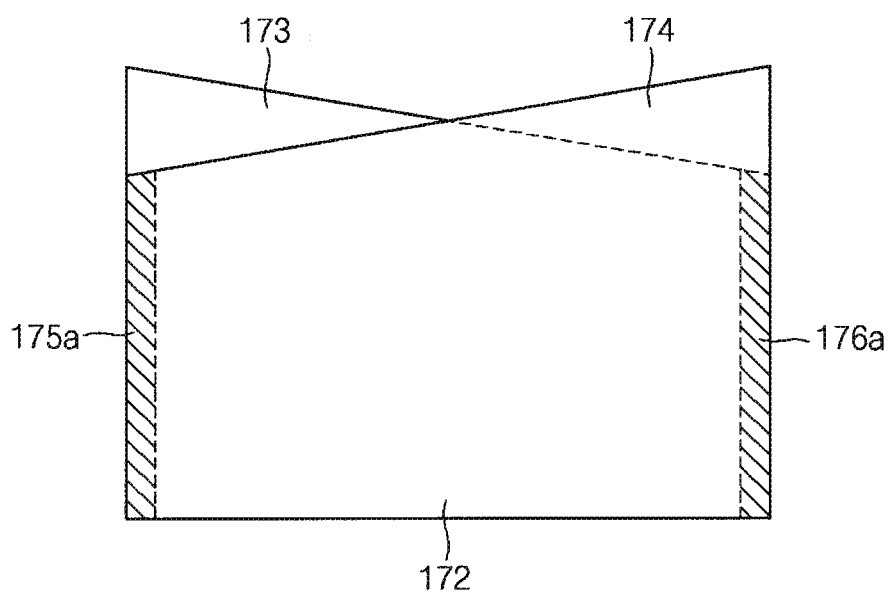
Figure 2D:
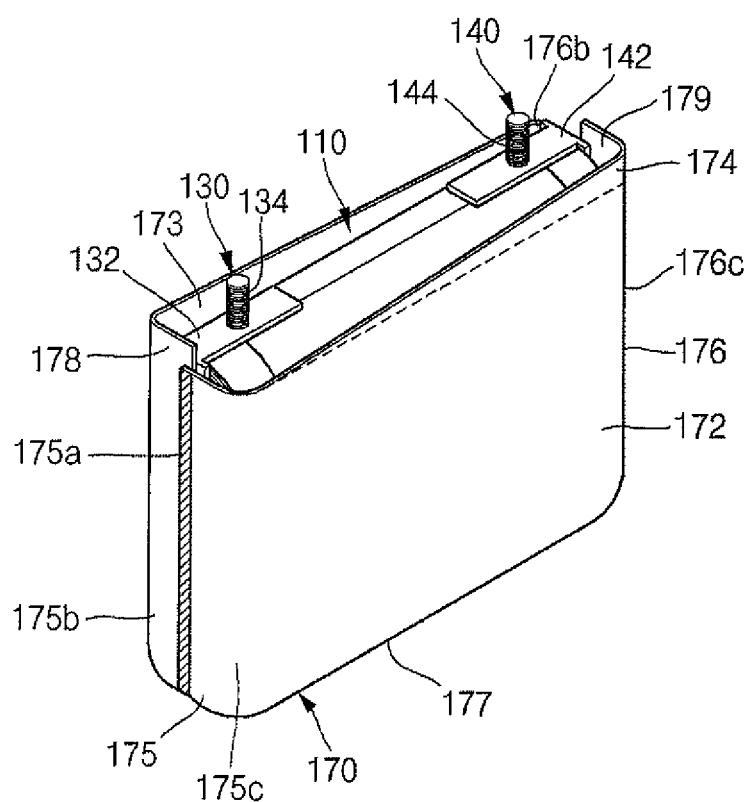
Figure 3B:
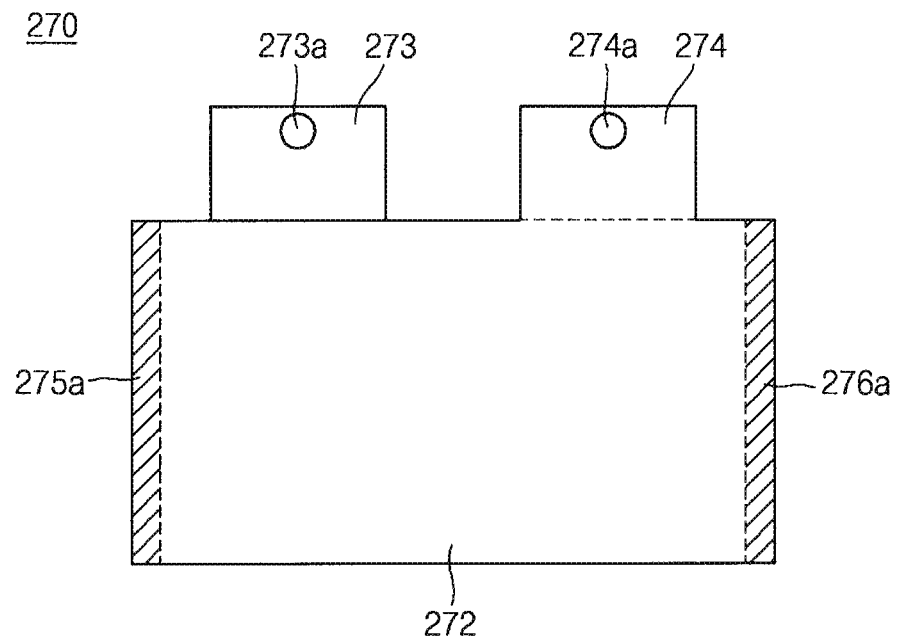
Figure 3C:
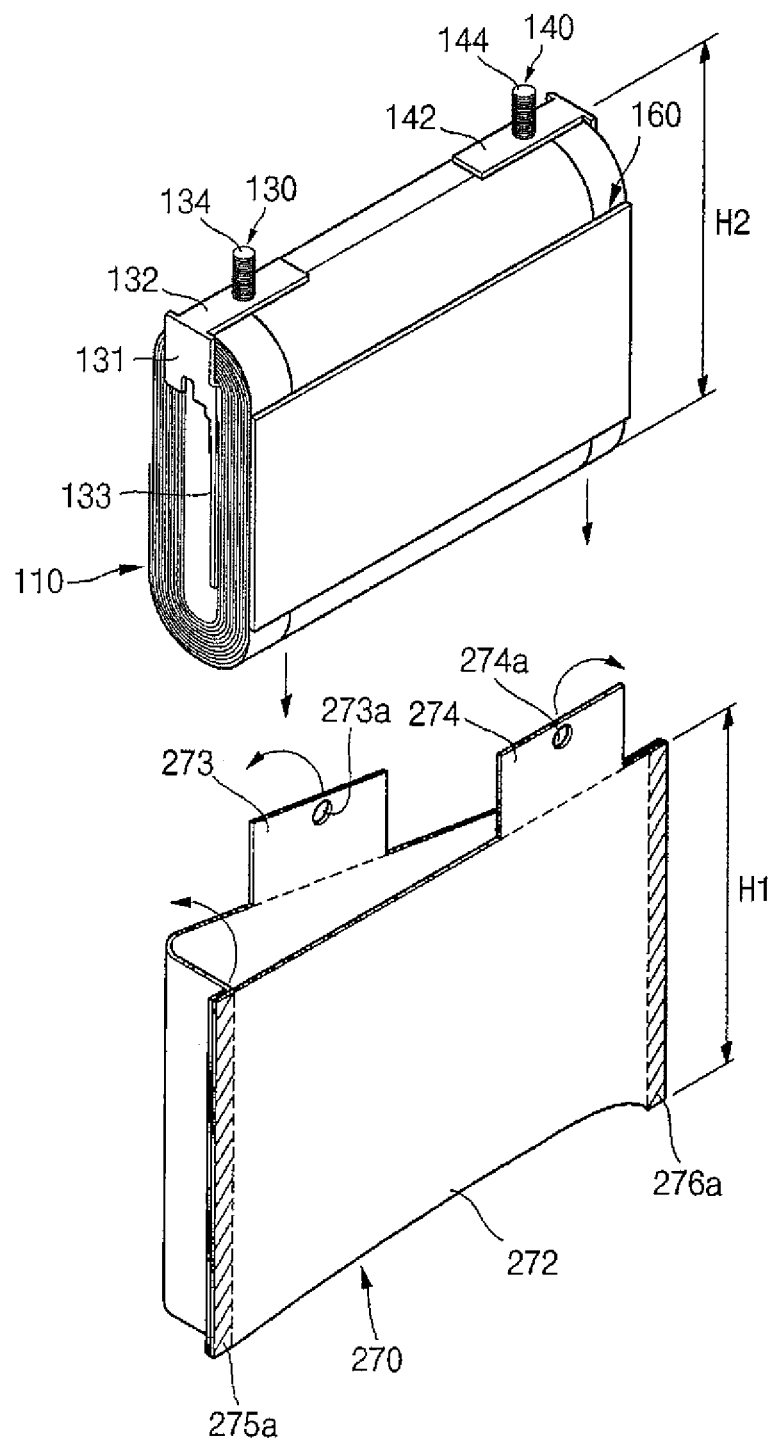
Figure 3D:
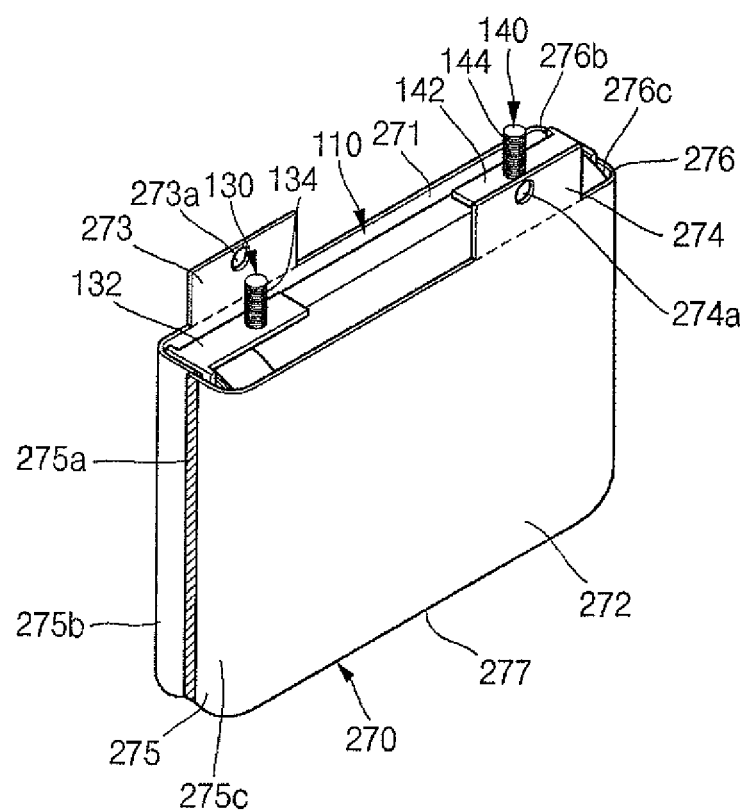
Figure 3E:
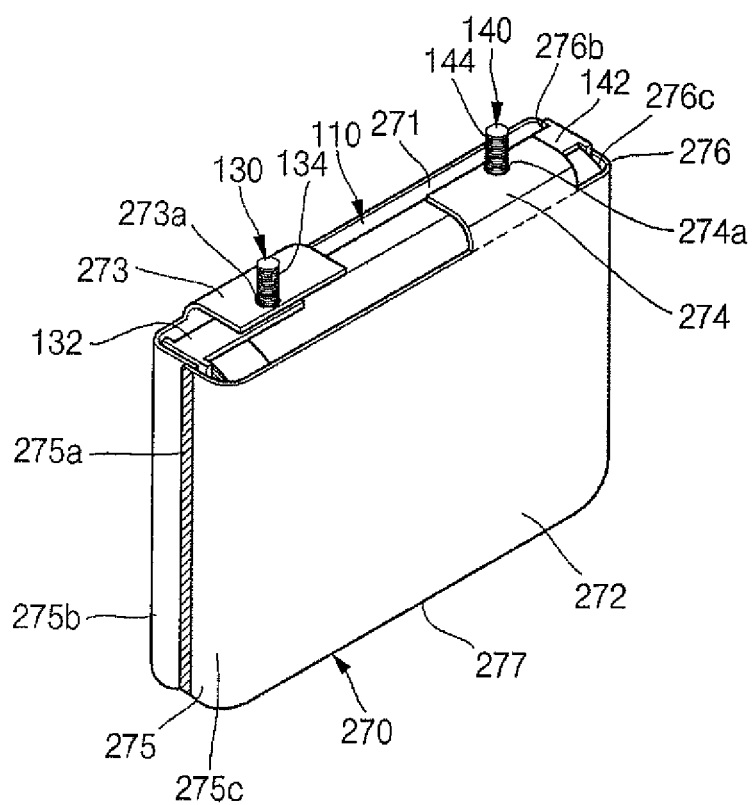
Figure 4A:
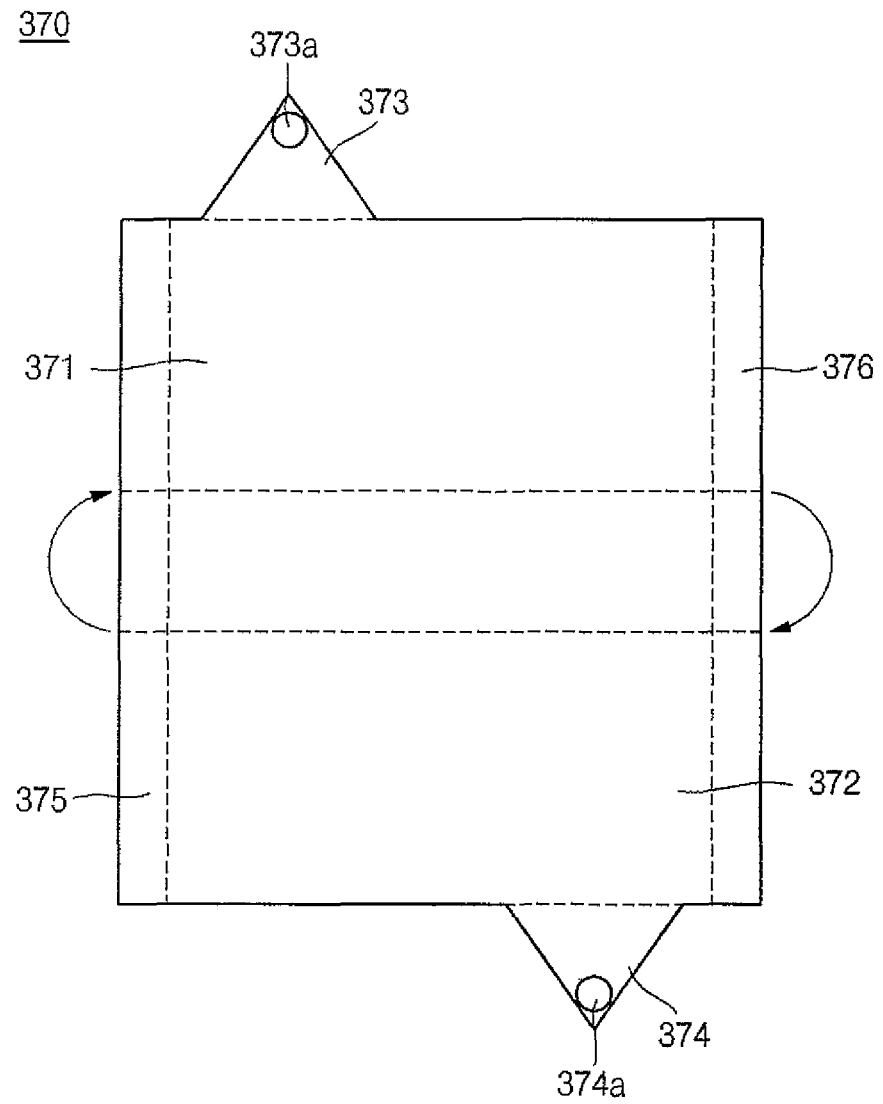
FIGS. 4A to 4E are diagrams illustrating a process of housing an electrode assembly in an insulation bag of a secondary battery according to another exemplary embodiment.
Figure 4B:
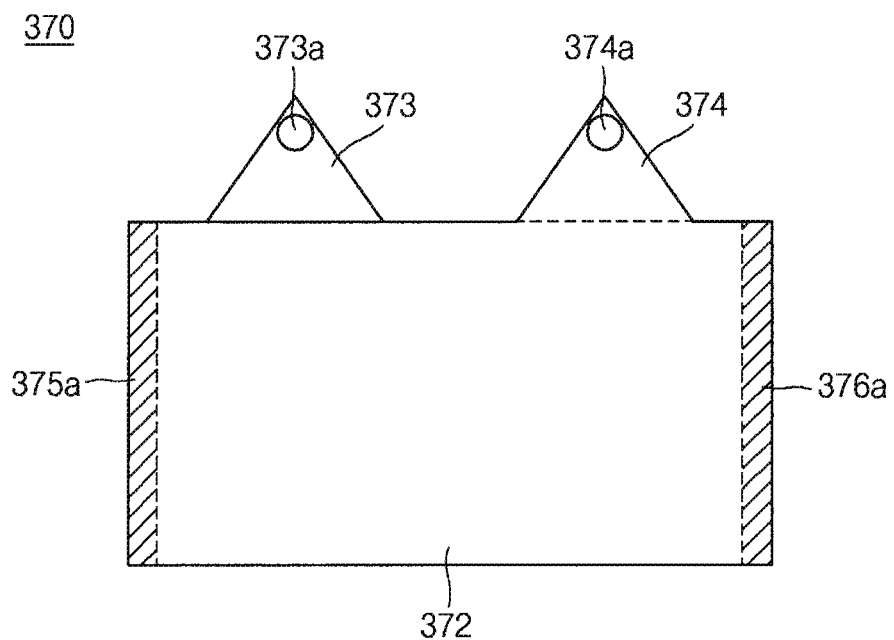
Figure 4C:
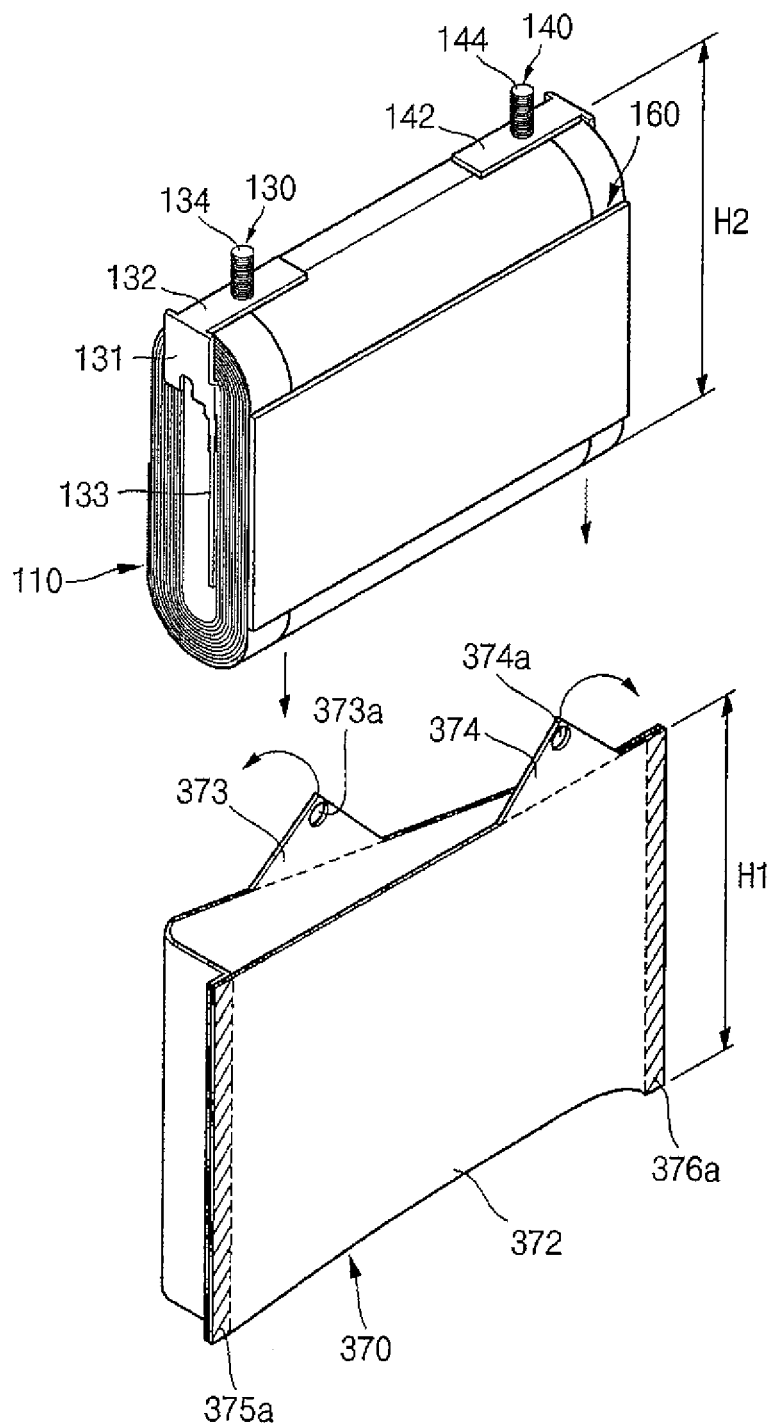
Figure 4D:
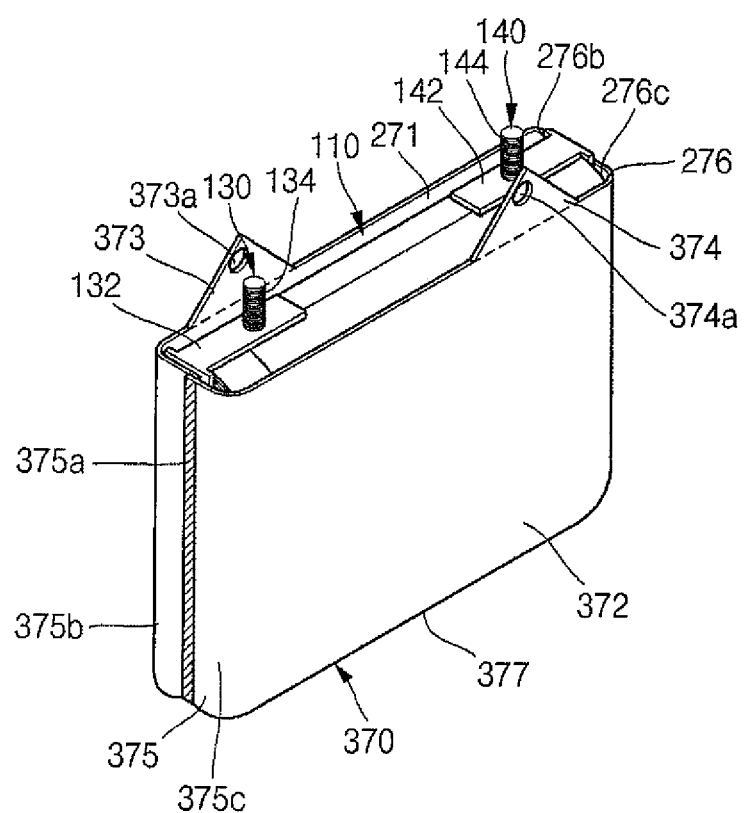
Figure 4E:
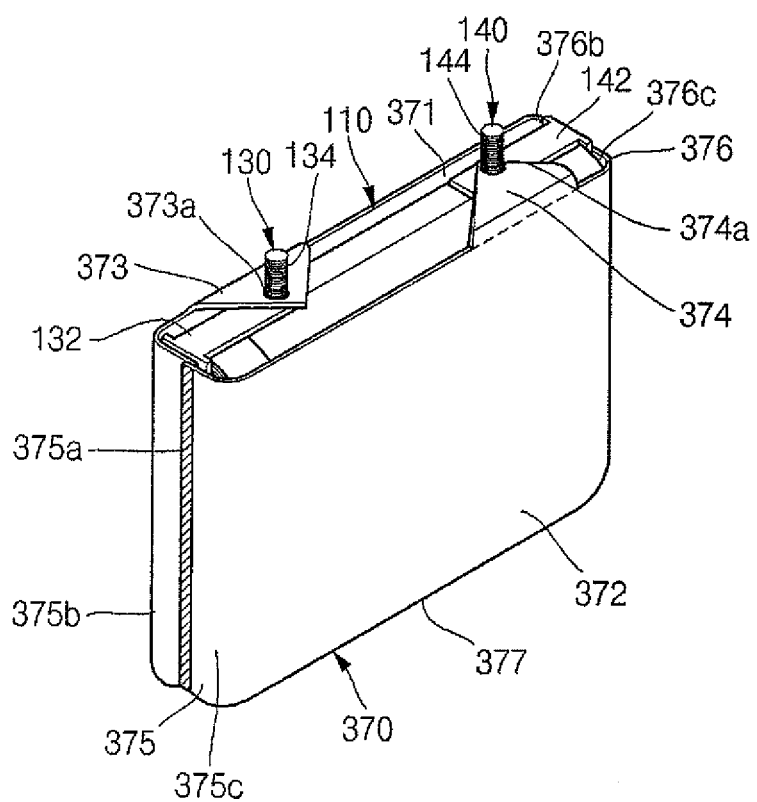
Figure 5A:
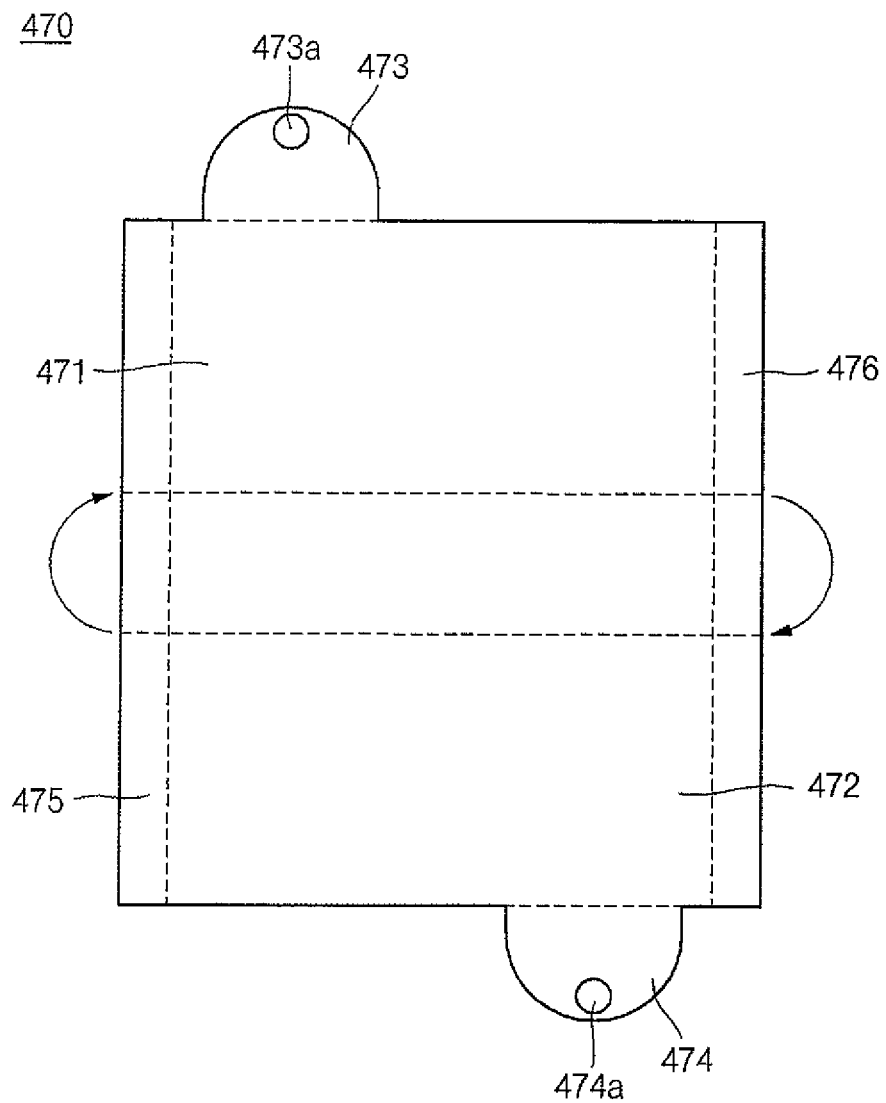
Figure 5D:
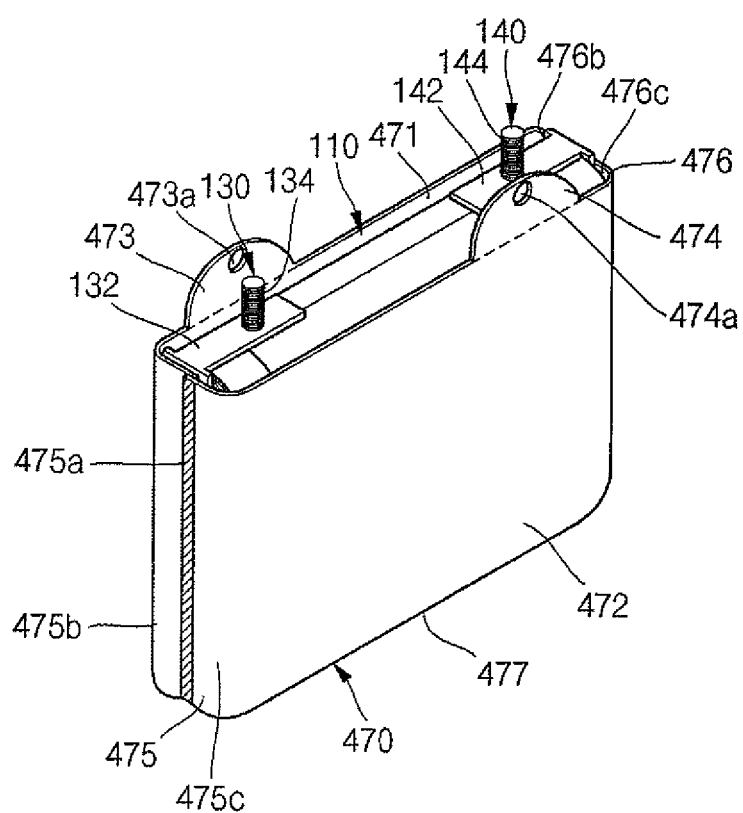

Referring to FIGS. 2A to 2C, an insulation bag 170 is formed by bending and sealing a parallelogram-shaped insulation sheet. In particular, an insulation sheet forming the insulation bag 170 is bent so that the first side surface portion 171 faces the second side surface portion 172. Here, the top of the first side surface portion 171 is lower than the top of the second extending portion 174. Also, the top of the second side surface portion 172 is lower than the top of the first extending portion 173. Then, a sealing process is performed in which one edge and the other edge of the insulation sheet are thermally bonded to form sealing portions 175a and 176a. In this way, the insulation bag 170 is formed in a pocket shape with an open top. The insulation sheet 170 formed using a parallelogram-shaped insulation sheet also has a third extending portion 178 formed at the top of the sealing portion 175a and the first sub-side surface portion 175b of the third side surface portion 175. Further, the insulation bag 170 has a fourth extending portion 179 formed at the top of the sealing portion 176a and the second sub-side surface portion 176c of the fourth side surface portion 176.

The first extending portion 173 at one side has a surface that extends above the second side surface portion 172, and the second extending portion 174 at the other side has a surface that extends above the first side surface portion 171. Accordingly, a technician or machine may grasp the free surfaces and pull apart the first extending portion 173 and the second extending portion 174 to then insert the electrode assembly 110 into the insulation bag 170. Accordingly, the insulation bag 170 according to exemplary embodiments allows separation of the first side surface portion 171 and the second side surface portion 172, without having to be concerned with static electricity generation at the insulation sheet.

Also, when the electrode assembly 110 is housed inside the insulation bag 170, the tops of the first side surface portion 171, second side surface portion 172, third side surface portion 175, and fourth side surface portion 176 are formed higher than the height of the top of the electrode assembly 110. That is, the height H1 of the insulation film is controlled against the height H2 of the electrode assembly 110, so that the electrode assembly 110 does not contact the case 120.

Below, the configuration of an insulation bag in a secondary battery according to other exemplary embodiments, and the process of housing an electrode assembly inside the insulation bag will be described in detail.

FIGS. 3A to 3E are diagrams illustrating a process of housing an electrode assembly in an insulation bag of a secondary battery according to another exemplary embodiment.

Referring to FIGS. 3A to 3E, with an insulation bag 270 according to another exemplary embodiment, as compared to the insulation bag 170 in FIGS. 2A to 2D, a third extending portion 178 and a fourth extending portion 179 are not formed, and a first extending portion 273 and a second extending portion 274 are configured differently. Accordingly, the insulation bag 270 will be described below with more detail provided regarding the first extending portion 273 and the second extending portion 274, while a detailed description of the elements that are the same as those of the insulation bag 170 in FIGS. 2A to 2D will not be provided.

The insulation bag 270 includes a first side surface portion 271, a second side surface portion 272, a first extending portion 273, a second extending portion 274, a third side surface portion 275, a fourth side surface portion 276, and a bottom surface portion 277.

The first side surface portion 271 extends from one side to an opposite side. Also, the second side surface portion 272 extends from one side to an opposite side, facing the first side surface portion 271. When the electrode assembly 110 is housed inside the insulation bag 270, the tops of the first side surface portion 271, second side surface portion 272, third side surface portion 275, and fourth side surface portion 276 are formed higher than the height of the top of the electrode assembly 110. That is, the height H1 of the insulation film is controlled against the height H2 of the electrode assembly 110, so that the electrode assembly 110 does not contact the case 120.

The first extending portion 273 extends upward from the one side of the first side surface portion 271. Also, the first extending portion 273 is rectangular in shape in one embodiment, but the present invention is not limited thereto. A first coupling through-hole 273a may be defined in the first extending portion 273 corresponding to the bolt extending portion 134 of the first electrode terminal 130. An insulation bag 270 according to another exemplary embodiment may achieve a firm coupling of the insulation bag 270 and the electrode assembly 110 by coupling the first coupling through-hole 273a with the bolt extending portion 134.

The second extending portion 274 extends upward from the opposite side of the second side surface portion 272. Also, the second extending portion 274 is rectangular in shape in one embodiment, but the present invention is not limited thereto. A second coupling through-hole 274a may be defined in the second extending portion 274 corresponding to the bolt extending portion 144 of the second electrode terminal 140. An insulation bag 270 according to another exemplary embodiment may achieve a firm coupling of the insulation bag 270 and the electrode assembly 110 by coupling the second coupling through-hole 274a with the bolt extending portion 144.

In the description below, the configuration of an insulation bag in a secondary battery according to other exemplary embodiments, and the process of housing an electrode assembly inside the insulation bag will be described in detail.

FIGS. 4A to 4E are diagrams illustrating a process of housing an electrode assembly in an insulation bag of a secondary battery according to another exemplary embodiment.

Referring to FIGS. 4A to 4E, an insulation bag 370 according to another exemplary embodiment is different from the insulation bag 270 in FIGS. 3A to 3E in terms of the structure of a first extending portion 373 and a second extending portion 374. Accordingly, the insulation bag 370 will be described below with more detail provided regarding the first extending portion 373 and the second extending portion 374, while a detailed description of the elements that are the same as those of the insulation bag 270 in FIGS. 3A to 3E will not be repeated.

An insulation bag 370 includes a first side surface portion 371, a second side surface portion 372, a first extending portion 373, a second extending portion 374, a third side surface portion 375, a fourth side surface portion 376, and a bottom surface portion 377.

The first side surface portion 371 extends from one side to an opposite side. Also, the second side surface portion 372 extends from one side to an opposite side, facing the first side surface portion 371.

The first extending portion 373 extends upward from the one side at the top of the first side surface portion 371. Also, the first extending portion 373 is triangular in shape in one embodiment, but the present invention is not limited thereto. A first coupling through-hole 373a may be defined in the first extending portion 373 corresponding to the bolt extending portion 134 of the first electrode terminal 130. An insulation bag 370 according to another exemplary embodiment may achieve a firm coupling of the insulation bag 370 and the electrode assembly 110 by coupling the first coupling through-hole 373a with the bolt extending portion 134.

The second extending portion 374 extends upward from the opposite side at the top of the second side surface portion 372. Also, the second extending portion 374 is triangular in shape in one embodiment, but the present invention is not limited thereto. A second coupling through-hole 374a may be defined in the second extending portion 374 corresponding to the bolt extending portion 144 of the second electrode terminal 140. An insulation bag 370 according to another exemplary embodiment may achieve a firm coupling of the insulation bag 370 and the electrode assembly 110 by coupling the second coupling through-hole 374a with the bolt extending portion 144.

Below, the configuration of an insulation bag in a secondary battery according to other exemplary embodiments, and the process of housing an electrode assembly inside the insulation bag will be described in detail.

FIGS. 5A to 5E are diagrams illustrating a process of housing an electrode assembly in an insulation bag of a secondary battery according to another exemplary embodiment.

Referring to FIGS. 5A to 5E, an insulation bag 470 according to another exemplary embodiment is different from the insulation bag 270 in FIGS. 3A to 3E in terms of the structure of a first extending portion 473 and a second extending portion 474. Accordingly, the insulation bag 470 will be described below with more detail provided regarding the first extending portion 473 and the second extending portion 474, while a detailed description of the elements that are the same as those of the insulation bag 270 in FIGS. 3A to 3E will not be provided.

An insulation bag 470 includes a first side surface portion 471, a second side surface portion 472, a first extending portion 473, a second extending portion 474, a third side surface portion 475, a fourth side surface portion 476, and a bottom surface portion 477.

The first side surface portion 471 extends from one side to an opposite side. Also, the second side surface portion 472 extends from one side to an opposite side, facing the first side surface portion 471.

The first extending portion 473 extends upward from the one side at the top of the first side surface portion 471. Also, the first extending portion 473 is semicircular in shape in one embodiment, but the present invention is not limited thereto. A first coupling through-hole 473a may be defined in the first extending portion 473 corresponding to the bolt extending portion 134 of the first electrode terminal 130. An insulation bag 470 according to another exemplary embodiment may achieve a firm coupling of the insulation bag 470 and the electrode assembly 110 by coupling the first coupling through-hole 473a with the bolt extending portion 134.

The second extending portion 474 extends upward from the opposite side at the top of the second side surface portion 472. Also, the second extending portion 474 is semicircular in shape in one embodiment, but the present invention is not limited thereto. A second coupling through-hole 474a may be defined in the second extending portion 474 corresponding to the bolt extending portion 144 of the second electrode terminal 140. An insulation bag 470 according to another exemplary embodiment may achieve a firm coupling of the insulation bag 470 and the electrode assembly 110 by coupling the second coupling through-hole 474a with the bolt extending portion 144.

A secondary battery according to exemplary embodiments resolves the limitation of opening an insulation bag due to static electricity, by having a first extending portion and a second extending portion on the upper portion of the insulation bag. Therefore, the secondary battery according to exemplary embodiments improves efficiency in housing an electrode assembly inside an insulation bag.

A secondary battery according to exemplary embodiments also provides coupling force between an electrode assembly and an insulation bag, through providing coupling between a first coupling through-hole and a second coupling through-hole defined in a first extending portion and a second extending portion of the insulation bag, and a first electrode terminal and a second electrode terminal.

Exemplary embodiments of a secondary battery having an insulation bag have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery comprising:
    an electrode assembly including a first electrode, a second electrode, and a separator between the first electrode and the second electrode;
    an insulation bag having an open top and housing the electrode assembly therein;
    a case housing the electrode assembly and the insulation bag therein; and
    a cap plate sealing the case,
    wherein the insulation bag comprises:
        a first side surface portion extending from one side of the electrode assembly to an opposite side of the electrode assembly;
        a second side surface portion extending from the one side of the electrode assembly to the opposite side of the electrode assembly and facing the first side surface portion;
        a first extending portion extending from an upper end of the first side surface portion at the one side, a height of the first extending portion above the upper end of the first side surface portion gradually increasing from one edge of the first side surface portion to an opposite edge of the first side surface portion; and
        a second extending portion extending from an upper end of the second side surface portion at the opposite side of the electrode assembly.

2. The secondary battery as claimed in claim 1, wherein the upper end of the first side surface portion is lower than an upper end of the second extending portion.

3. The secondary battery as claimed in claim 2, wherein the upper end of the second side surface portion is lower than an upper end of the first extending portion.

4. The secondary battery as claimed in claim 1, wherein the insulation bag further comprises:
    a third side surface portion connecting an end of the first side surface portion at the one side to an end of the second side surface portion at the one side; and
    a fourth side surface portion connecting an end of the first side surface portion at the opposite side to an end of the second side surface portion at the opposite side.

5. The secondary battery as claimed in claim 4, wherein the insulation bag further includes a bottom surface portion extending from a bottom end of the first side surface portion, a bottom end of the second side surface portion, a bottom end of the third side surface portion, and a bottom end of the fourth side surface portion.

6. The secondary battery as claimed in claim 1, further comprising:
    a first electrode terminal electrically connected to the first electrode, and extending outward through the cap plate; and
    a second electrode terminal electrically connected to the second electrode, and extending outward through the cap plate.

7. The secondary battery as claimed in claim 6, wherein
    the first electrode includes a first non-coating portion not coated with a first active material and extending toward the one side,
    the second electrode includes a second non-coating portion not coated with a second active material and extending toward the opposite side, and
    the first electrode terminal is welded to the first non-coating portion, and the second electrode terminal is welded to the second non-coating portion.

8. The secondary battery as claimed in claim 1, wherein the first extending portion and the second extending portion have a triangular shape, a quadrangular shape, or a semicircular shape.

9. The secondary battery as claimed in claim 1, wherein the first side surface portion and the second side surface portion have a greater height than the electrode assembly.

10. The secondary battery as claimed in claim 1, further comprising a nail safety device interposed between the electrode assembly and the insulation bag, and electrically connected to the first electrode or the second electrode of the electrode assembly.

11. The secondary battery as claimed in claim 1, wherein the insulation bag comprises PP (polypropylene) material.

12. A secondary battery comprising:
an electrode assembly including a first electrode, a second electrode, and a separator between the first electrode and the second electrode;
an insulation bag having an open top and housing the electrode assembly therein;
a case housing the electrode assembly and the insulation bag therein; and
a cap plate sealing the case, wherein the insulation bag comprises:
a first side surface portion extending from one side of the electrode assembly to an opposite side of the electrode assembly;
a second side surface portion extending from the one side of the electrode assembly to the opposite side of the electrode assembly and facing the first side surface portion;
a first extending portion extending from an upper end of the first side surface portion and being closer to the one side of the electrode assembly than to the opposite side of the electrode assembly; and
a second extending portion extending from an upper end of the second side surface portion and being closer to the opposite side of the electrode assembly than to the one side of the electrode assembly,
wherein the insulation bag further comprises:
a third side surface portion connecting an end of the first side surface portion at the one side of the electrode assembly to an end of the second side surface portion at the one side of the electrode assembly; and
a fourth side surface portion connecting an end of the first side surface portion at the opposite side of the electrode assembly to an end of the second side surface portion at the opposite side of the electrode assembly, and
wherein the third side surface portion and the fourth side surface portion respectively comprise:
a sealing portion at a center thereof;
a first sub-side surface portion extending from the sealing portion to the first side surface portion; and
a second sub-side surface portion extending from the sealing portion to the second side surface portion.

13. The secondary battery as claimed in claim 12, wherein the sealing portion is formed by thermal bonding.

14. The secondary battery as claimed in claim 12, wherein the insulation bag further comprises:
a third extending portion extending upward from an upper end of the third side surface portion; and
a fourth extending portion extending upward from an upper end of the fourth side surface portion.

15. The secondary battery as claimed in claim 14, wherein
the third extending portion extends upward from upper ends of the sealing portion and the first sub-side surface portion of the third side surface portion, and
the fourth extending portion extends upward from upper ends of the sealing portion and the second sub-side surface portion of the fourth side surface portion.

16. The secondary battery as claimed in claim 15, wherein the first extending portion and the third extending portion extend together.

17. The secondary battery as claimed in claim 15, wherein the second extending portion and the fourth extending portion extend together.

18. A secondary battery comprising:
an electrode assembly including a first electrode, a second electrode, and a separator between the first electrode and the second electrode;
an insulation bag having an open top and housing the electrode assembly therein;
a case housing the electrode assembly and the insulation bag therein; and
a cap plate sealing the case,
wherein the insulation bag comprises:
a first side surface portion extending from one side of the electrode assembly to an opposite side of the electrode assembly;
a second side surface portion extending from the one side of the electrode assembly to the opposite side of the electrode assembly and facing the first side surface portion;
a first extending portion extending from an upper end of the first side surface portion at the one side of the electrode assembly; and
a second extending portion extending from an upper end of the second side surface portion at the opposite side of the electrode assembly,
wherein the secondary battery further comprises:
a first electrode terminal electrically connected to the first electrode, and extending outward through the cap plate; and
a second electrode terminal electrically connected to the second electrode, and extending outward through the cap plate, and
wherein the first electrode terminal passes through a first coupling through-hole defined in the first extending portion, and the second electrode terminal passes through a second coupling through-hole defined in the second extending portion.

* * * * *